June 6, 1961     J. C. ALDERMAN     2,987,076
PRESET FLUID CONTROL SYSTEM
Filed June 30, 1958
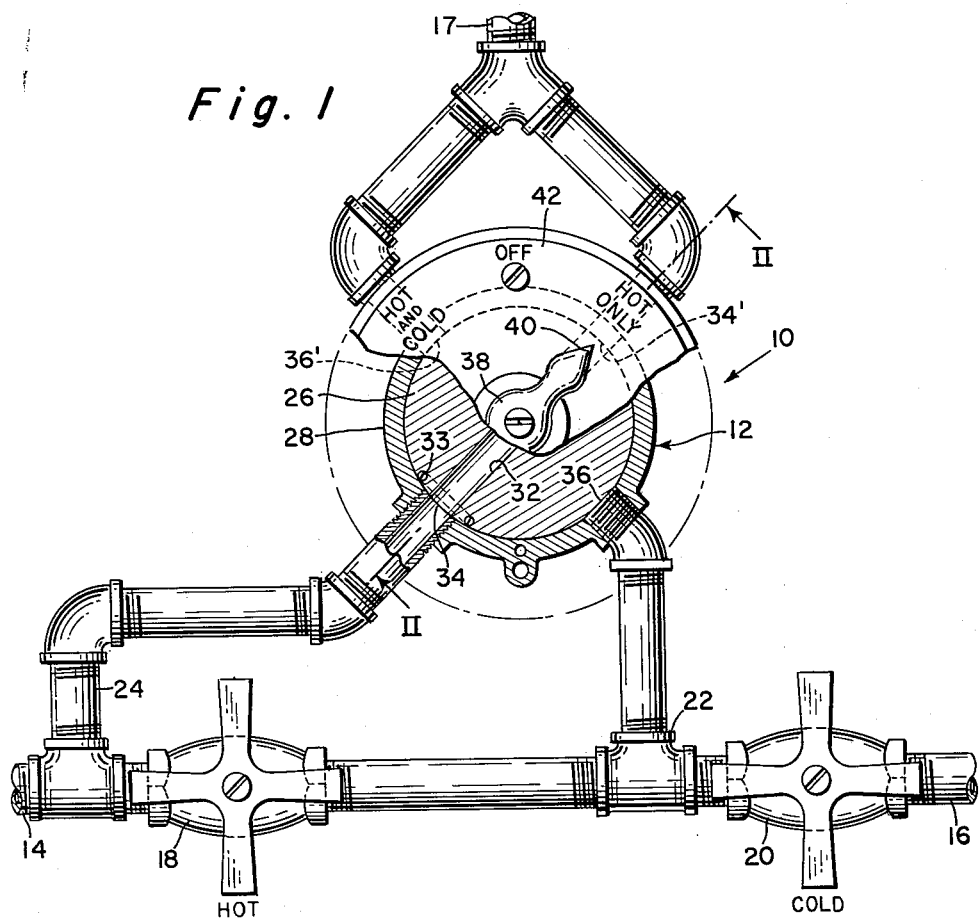
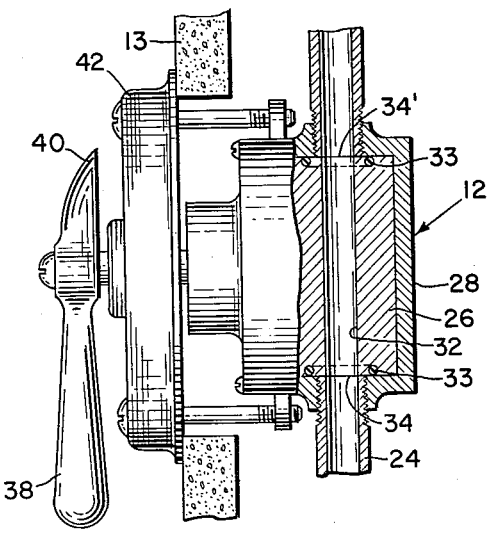
INVENTOR.
JOHN C. ALDERMAN
BY
*F. J. Schmitt*
*George J. Rubens*
ATTORNEYS

2,987,076
PRESET FLUID CONTROL SYSTEM
John C. Alderman, 1340 N. Euclid Ave., Upland, Calif.
Filed June 30, 1958, Ser. No. 745,781
3 Claims. (Cl. 137—599)
(Granted under Title 35, U.S. Code (1952), sec. 266)

The invention described herein may be manufactured and used by or for the Government of the United States of America for governmental purposes without the payment of any royalties thereon or therefor.

This invention relates to a preset fluid control system and more particularly to such a system capable of admitting one fluid or a combined mixture of fluids preset in temperature and pressure wherein the same preset condition can be obtained repeatedly without disturbing the setting.

Such a system is particularly suitable for shower bath preparation wherein it is a conventional practice to first purge the pipe system of any cold water, and then manipulate the hot and cold valves back and forth until the desired water pressure and temperature conditions are eventually achieved. This procedure has several shortcomings, namely, it is time consuming, likely to be extremely uncomfortable, and results in a water waste, the latter being a critical factor in installations where water is in short supply, such as on shipboard. Despite the fact that most shower-minded people prefer a certain condition of water temperature and pressure, it is invariably a time consuming task of adjusting the hot and cold valves to achieve this desired environment, and often one is either scalded or chilled in the process. Furthermore, such jockeying of the valves for the right water temperature and pressure inherently results in a waste of both hot and cold water.

Despite this long felt need little has been done to alleviate this condition. While numerous mixing valves have been proposed, the selected preset mixed condition is invariably disturbed when the valve is moved to another position.

A principal object of this invention is to provide a valve system with a preset condition which is not changed when the valve is moved to another position, that is, the preset condition is consistently restorable to the exact position.

Another object is to provide a shower valve system which cannot be accidentally moved to cause discomfort or scalding of the user.

A further object is to provide a valve system for a shower which will expedite initial preparation, reduce discomfort, and ensure consistent preset conditions.

Other objects and many of the attendant advantages of this invention will be readily appreciated as the same becomes better understood by reference to the following detailed description when considered in connection with the accompanying drawings wherein:

FIG. 1 is a front elevation view of the novel valve system; and

FIG. 2 is a side elevation view of the selector valve, in section, mounted to a wall structure.

Referring to the drawings, where like reference numerals refer to identical parts throughout the drawing there is shown in FIG. 1 a shower valve system designated generally as numeral 10 comprising a selector valve 12 mounted to a wall 13, the selector valve being interposed between hot and cold water supply intakes 14 and 16, respectively, and a shower head, not shown, connected to an outlet line 17.

Intakes 14 and 16 are connected to a pair of corresponding flow control valves 18 and 20 which are connected together in series by an inlet pipe and T-joint 22 to enable the hot and cold water to be mixed according to the position of the respective valves. Valves 18 and 20 are of a conventional design, preferably of the needle-type to permit a fine adjustment of the liquid flow therethrough.

Intake 14 is provided with a bypass inlet pipe 24 for directing hot water directly to selector valve 12 bypassing hot water control valve 18. The flow in inlet pipe 22, being a predetermined mixture of water from the hot and cold water valves 18 and 20, respectively, is directed to the same side of selector 12 adjacent to inlet pipe 24.

Referring to FIG. 2, selector valve 12 comprises a disk-like valve 26 rotatably supported in a valve body 28. Valve 26 is provided with a diametrically drilled passage 32 extending therethrough. An O-ring 33 is seated in the valve at each end of passage 32 to provide a sealed engagement with the core of the valve body. Passage 32 is adapted to be aligned alternatively with a pair of oppositely disposed ports 34, 34' and 36, 36' in the valve body when the valve is rotated by means of a handle 38. Valve handle 38 and passage 32 are coextensive, the former having one end shaped as a pointer 40. Handle 38 could be located at a lateral position outside of the shower enclosure and the valve rotated through a suitable drive mechanism.

Port 34 is fixedly aligned with inlet pipe 24 and admits hot water to the valve. When passage 32 is aligned with port 34, hot water passes through the valve and out port 34' to the shower head in pipe 17. Port 36 is fixedly aligned with inlet pipe 22 and admits a preselected mixture of hot and cold water to the valve. When passage 32 is aligned with port 36, the preselected mixture passes through the valve and out port 36' to the shower head in pipe 17.

The position of ports 34' and 36' are appropriately labeled on a faceplate 42 as Hot Only and Hot and Cold. Pointer 40 dictates the position of the valve to provide the selector water flow. An Off position on the faceplate is located between the Hot Only and Hot and Cold in which position passage 32 is blocked at both ends by the wall of valve body 28.

In operation, the user initially rotates valve 26 by means of handle 38 until pointer 40 is aligned with the Hot Only position which admits hot water to the shower head from intake 14 to purge the cold water from the shower system. Thereafter, the user rotates valve 26 to the Hot and Cold position to obtain a preselected temperature and pressure flow of water as determined by the setting of valves 18 and 20. To terminate the shower, the valve is simply moved to the Off position where inlet ports 34 and 36 are blocked by the valve body. It should be noted that should the valve be accidentally jarred from the Off position, the water system will still be shut off preventing possible scalding or a discomfortable sudden change of water temperature that is likely in the conventional valve system.

Obviously many modifications and variations of the present invention are possible in the light of the above teachings. It is therefore to be understood that within the scope of the appended claims the invention may be practiced otherwise than as specifically described.

I claim:

1. A preset temperature control system comprising hot and cold water intakes, a manually adjustable flow control valve connected in each intake, said control valves being connected together to provide a combined inlet of hot and cold water at a preset temperature and pressure depending on the respective settings of said control valves, said hot water intake having a bypass inlet connected before the corresponding control valve, a manual rotary selector valve having a pair of outlets corresponding to said pair of inlets, means for discharging the hot water and the combined flow of hot and cold water from said outlets in a common flow, said selector valve being connected to said inlets and said means for discharging, and means for moving said selector valve for rotatably selecting for the outlet the flow from the hot water inlet or the flow combined hot and cold inlet whereby after an initial use of the hot water to purge the system, the preset mixture of hot and cold water is instantly available without changing the setting of said control valves.

2. A preset temperature and pressure control system comprising hot and cold water intakes, a manually adjustable flow control valve connected in each intake, said control valves being connected together to provide a combined inlet flow of hot and cold water at a preset temperature and pressure depending on the respective adjustments of said control valves, said hot water intake having a hot water bypass inlet, a manual selector valve having a valve body and a valve member, said valve body having a pair of inlet ports connected to the corresponding inlets and a pair of outlet ports leading to a common discharge, said valve member rotatably mounted in said valve body, said valve member having a diametrical drilled passage adapted to align corresponding ports of each pair, whereby said selector valve can be rotated to one position to select hot water flow for flushing purposes, and thereafter the selector valve is rotatable to a second position to select the preset combined flow for bathing purposes without changing the setting of said control valves, said selector valve having an "off" position wherein said drilled passage is blocked by the valve body.

3. In a hot and cold water discharge system having a hot water intake, a cold water intake and a single discharge outlet, a fluid control device comprising a distributing pipe means connecting said hot and cold water intakes, a separate hot water flow control valve operatively connected to said distributing pipe means between the hot and cold water intakes, a separate cold water flow control valve operatively connected to said distributing pipe means between the hot water flow control valve and the cold water intake a hot water purging inlet pipe operatively connected to said distributing pipe means between the cold water flow control valve and the hot water intake, a combined hot and cold water inlet pipe operatively connected to said distributing pipe means between said hot water flow control valve on one side and said cold water flow control valve on the other side, a combined hot and cold water outlet pipe, a hot water outlet pipe, said combined hot and cold water outlet pipe and said hot water outlet pipe being connected to form said single discharge outlet, selector means for alternatively connecting said hot water inlet pipe to said hot water outlet pipe in one position and connecting said combined hot and cold water inlet pipe to said combined hot and cold water outlet pipe in another position whereby said discharge system can be initially purged by hot water and then can be set to discharge a predetermined combination of hot and cold water.

References Cited in the file of this patent
UNITED STATES PATENTS

| | | |
|---|---|---|
| 395,673 | Vernon | Jan. 1, 1889 |
| 508,584 | Stevens | Nov. 14, 1893 |
| 1,892,776 | Mix | Jan. 3, 1933 |
| 2,264,876 | Hackley | Dec. 2, 1941 |
| 2,434,352 | Edwards | Jan. 13, 1948 |
| 2,528,422 | Chace | Oct. 31, 1950 |